(12) United States Patent
Nicolas

(10) Patent No.: US 10,156,628 B2
(45) Date of Patent: Dec. 18, 2018

(54) METHOD FOR DETERMINING INDOOR LOCATIONS OF MOBILE RECEIVER UNITS

(71) Applicant: Luxembourg Institute of Science And Technology (LIST), Esch/Alzette (LU)

(72) Inventor: Damien Nicolas, Esch/Alzette (LU)

(73) Assignee: Luxembourg Institute of Science and Technology (LIST), Luxembourg (LU)

( * ) Notice: Subject to any disclaimer, the term of this patent is extended or adjusted under 35 U.S.C. 154(b) by 421 days.

(21) Appl. No.: 15/101,173

(22) PCT Filed: Dec. 17, 2014

(86) PCT No.: PCT/EP2014/078315
§ 371 (c)(1),
(2) Date: Jun. 2, 2016

(87) PCT Pub. No.: WO2015/091696
PCT Pub. Date: Jun. 25, 2015

(65) Prior Publication Data
US 2016/0306025 A1 Oct. 20, 2016

(30) Foreign Application Priority Data

Dec. 19, 2013 (EP) .................................. 13198427

(51) Int. Cl.
*G01S 5/02* (2010.01)
*H04W 64/00* (2009.01)
(52) U.S. Cl.
CPC .......... *G01S 5/0252* (2013.01); *G01S 5/0278* (2013.01); *H04W 64/00* (2013.01)

(58) Field of Classification Search
CPC .................................. H04W 64/00; G01S 5/02
USPC ............................................ 455/456.1–456.6
See application file for complete search history.

(56) References Cited

U.S. PATENT DOCUMENTS

| 7,299,059 B2 | 11/2007 | Misikangas et al. |
| 7,616,153 B2 * | 11/2009 | Honda .................... G01S 19/14 342/357.74 |
| 7,904,097 B2 | 3/2011 | Misikangas |
| 2005/0243936 A1 | 11/2005 | Agrawala et al. |
| 2011/0103432 A1 * | 5/2011 | Tangudu ................. G01S 19/21 375/150 |
| 2015/0215149 A1 * | 7/2015 | Mochizuki .......... H04L 27/2695 375/219 |

OTHER PUBLICATIONS

International Search Report from corresponding International Application No. PCT/EP2014/078315, dated Mar. 5, 2015.

\* cited by examiner

*Primary Examiner* — Michael T Vu
(74) *Attorney, Agent, or Firm* — Sandberg Phoenix & von Gontard P.C.

(57) ABSTRACT

The present invention relates to a method of determining the indoor position of a mobile computing device using the signal strength measurements of a plurality of electromagnetic signals which are emitted from fixed locations. By using a heuristic which takes the observed behavior of signal strength measuring devices into account, the method allows to increase the accuracy and robustness of similar known methods.

13 Claims, 1 Drawing Sheet

METHOD FOR DETERMINING INDOOR LOCATIONS OF MOBILE RECEIVER UNITS

CROSS-REFERENCE TO RELATED APPLICATIONS

The present invention is the US national stage under 35 U.S.C. § 371 of International Application No. PCT/EP2014/078315, which was filed on Dec. 17, 2014, and which claims the priority of application EP 13198427.0 filed on Dec. 19, 2013, the content of which (text, drawings and claims) are incorporated here by reference in its entirety.

FIELD

The present invention relates to a method for determining the indoor location of a mobile computing device. In particular, it relates to such a method which uses the received signal strength from several signal emitters, which are positioned in fixed locations. The invention further relates to a computer program and device for implementing the described method.

BACKGROUND

The availability of mobile networked computing devices, such as smartphones or tablet computers, has given rise to the deployment of location based services. Known devices are equipped with at least one wireless networking interface, which allows them to connect to wireless local area networks, WLAN, or cellular data transmission networks such as UMTS, HSDPA or LTE networks. Many known devices are further equipped with a Global Positioning System, GPS, receiver, which generally enables the location of the device to be computed if it can receive broadcast signals emitted from at least four distinct GPS satellites. The mobile devices are further equipped with computing means that enable them to run software applications, to receive, send and process data. Location based services typically use the location coordinates as determined by the GPS receiver to provide location specific data via the network to the user. While this solution is both useful and provides sufficient precision for outdoor use cases (an accuracy of about 10 meters is provided), it is not useful when the mobile device to which the location specific data is to be sent is located indoors. As no line of sight from the device to the GPS satellite system exists, the device cannot use GPS data to compute its position and to request location specific data from the network.

Indoor location determination systems have been proposed based on various technical approaches. It has been proposed to use either active or passive tags, whose presence can be detected by the corresponding detectors or emitters, installed at known locations in an indoor environment. Such solutions rely on a dedicated equipment infrastructure and inherently suffer, besides being costly to put into practice, from scalability issues. As a consequence, the use and adoption of such systems is limited.

Patent document US 2005/0243936 A1 discloses a method and system for determining user location in a wireless communication network. The method acquires, at a mobile device, an indication of the signal strength of a set of deployed access points, such as for example WLAN access points. By using a previously constructed radio map, which maps the received signal strengths to probabilities of being in a specific location within the coverage area of the access points, the method locates the receiving device as being at a location at which the probability of measuring the set of signal strengths is highest.

The disclosed system makes use of equipment that is in general already deployed in many indoor locations. Indeed, most buildings or public areas are covered by several WLAN access points, whose locations and geographical coordinates are known. The assumption on the receiving device is that it is equipped with a wireless network interface card, NIC, which is able to provide a received signal strength indication, RSSI.

While the disclosed method is promising, practical implementations using today's widely available smartphones or tablet computers, have failed to produce accurate location determinations. This appears to be due to unreliable RSSI values being provided by the operating systems of the mobile devices. While the disclosed system relies on the observation that the measured signal strength increases monotonically with the number of collected measurement samples, this is not true if the lack of measurements is due to the behavior of the measuring device or terminal itself.

SUMMARY

It is an objective of the present invention to provide a method and device for determining indoor locations of mobile receiver units which overcomes at least some of the disadvantages of the prior art.

In accordance with various embodiments of the invention, there is provided a method for determining the position of a mobile computing device capable of receiving electromagnetic signals from a set of K>1 access points emitting such signals, and measuring the signal power thereof, with respect to a set of predetermined locations. The device can be a mobile smartphone or tablet computing device, which is powered by a battery, and the electromagnetic signals can be a wireless local area network, WLAN signal complying with the IEEE 802.11a, g or n standard. Similarly, the access points can be compliant WLAN access points, which can at the same time be nodes in a data communication network. However, the invention is not limited to such an infrastructure and is readily applicable to any electromagnetic signals emitted by a fixed equipment, and whose signal power can be measured at a mobile computing device or terminal. The access points are part of a fixed infrastructure and their location does not change in time. The set of predetermined locations comprises fixed locations, provided for example by their respective geographical coordinates, which are located within the coverage area of at least one of the access points. In various implementations, the set of predetermined locations comprises a regular grid of predetermined locations.

The method comprises:
  providing a mapping, which assigns a probability value to each location in the set of predetermined locations, as a function of a vector of determined signal power values, wherein each vector component represents an indication of the power of the signal emitted by a given access point k, $1 \leq k \leq K$, as received by the device 100 in a given location;
  providing, for the signal emitted by each access point k, an ordered series of increasing distinct signal power values as measured by the device in a given location, together with respective count values indicating how many times each signal power value was measured during a predetermined time period—the corresponding data can, in various instances, be provided by means of a histogram wherein each distinct signal power value is represented by a histogram bin;

for each ordered series of values, detecting a count value or a sequence of count values being equal to zero, which is preceded and followed by a non-zero count value—this step allows to detect empty bins in the histogram, which are surrounded by non-empty bins;

correcting the detected count values to non-zero count values, which are computed using an interpolating function of preceding and/or following non-zero count values, in various instances, of non-zero count values immediately preceding and/or following the detected zero count values in the series;

repeating the previous steps until each ordered series of values comprises no more zero count values, which are preceded and followed by a non-zero count value;

determining a signal power value for the signal emitted by each access point, wherein the value is based on the corrected series of signal power count values;

determining the location of the mobile computing device with respect to the set of predetermined locations, wherein the location is determined using at least the predetermined location for which the mapping indicates the highest probability based on the determined signal power values. The location can, in various instances, be provided by its geographical coordinates, or with respect to its position relative to the coordinates of the predetermined locations.

The steps of detecting and correcting count values, as well as determining a signal power value, can, in various instances, be performed by computing means of the mobile computing device which has measured the signal power values. Alternatively, these steps can be performed by computing means of a computing device on which the original uncorrected measured values are provided. The resulting k determined signal power values are provided on the same device on which the mapping is provided, which can be the measuring mobile computing device, or another computing device. The location of the mobile computing device can be determined by any device which has access to the determined signal power values and the mapping.

In various embodiments, the step of correcting the detected count values can comprise setting the detected count values so that the preceding and following non-zero count values, and the corrected count values, satisfy a linear function of the signal power.

The step of correcting the detected count values can alternatively comprise correcting the count values so that all count values satisfy a Gaussian function of the signal power. The Gaussian function can be a normalized Gaussian function.

The step of determining a signal power can, in various instances, comprise setting the determined signal power to a weighted average of the values in the provided series of measured signal power values, wherein each signal power value is weighted by its corresponding corrected count value.

The step of position determination can, in various instances, comprise the further step of selecting the location of the receiving device as the predetermined location for which the mapping indicates the highest probability based on the vector of determined signal power values.

Further, the step of position determination can comprise the step of selecting three or more predetermined locations for which the mapping indicates the three or more highest probabilities based on the vector of determined signal power values, and computing the position of the receiving device as the average location of the selected predetermined locations.

The determined position can, in various instances, be stored for future use. In particular, a history of determined location can be stored for each uniquely identifiable device whose position is being determined. If a determined position is unlikely with respect to previously determined locations for the same device, the determined position can, in various instances, be rejected as being erroneous. The likelihood of a determined position with respect to previously determined positions can for example be expressed by an inverse of the distance between the determined position and the latest determined position in the device's location history.

The step of providing a mapping can, in various instances, comprise the further steps of:

providing, for the signal emitted by each access point, an ordered series of increasing distinct signal power values as measured by a device in one of the predetermined locations, together with respective count values indicating how many times each signal power value was measured during a predetermined time period;

for each ordered series of values, detecting a count value or a sequence of count values being equal to zero, which is preceded and followed by a non-zero count value;

correcting the detected count values to non-zero count values, wherein the non-zero count values are computed using an interpolating function of preceding and/or following non-zero count values, and in various instances of non-zero count values immediately preceding and/or following the detected zero count values in the series;

repeating the preceding steps until each ordered series of values comprises no zero count values, which are preceded and followed by a non-zero count value;

normalizing in each series the count values so that their sum adds up to one, and so that each normalized value represents the probability of occurrence of the corresponding signal power value;

associating the probabilities with the corresponding access point and the predetermined location;

repeating the above steps for each of the predetermined locations.

The step of correcting the count values during the determination of the mapping can, in various instances, comprise setting the detected count values so that the preceding and following non-zero count values, and the corrected count values, satisfy a linear or affine function of the signal power. Alternatively, the detected count values can be corrected so that all count values satisfy a Gaussian function of the signal power. The Gaussian function can be a normalized Gaussian function.

Alternatively, the method can comprise providing, for the signal emitted by each access point, an ordered series of increasing distinct signal power values as measured by at least two devices in the same one of the predetermined locations, together with respective count values indicating how many times each signal power value was measured during a predetermined time period by each one of the devices. The step of correcting the count values can in that case further comprise:

detecting distinct signal power values for which each one of the devices has provided a non-zero count value, and using the average of the count values as the corrected count value for the detected signal power values;

detecting distinct signal power values for which at least one device provided a count value being equal to zero, preceded and followed by non-zero count values, and correcting the detected count value to the average of the non-zero count values that are provided for the same signal power value by other devices.

In various other embodiments of the invention, there is provided a device capable of implementing the method according to the invention. The device comprises:

a memory element, in which at least one ordered series of increasing distinct signal power values are provided, together with respective count values indicating how many times each signal power value was measured during a predetermined time period by a measuring means during a predetermined time period;

computing means, wherein the computing means are configured to detect, for each ordered series of values, a count value or a sequence of count values being equal to zero, which is preceded and followed by a non-zero count value;

correct the detected count values to non-zero count values, which are a function of preceding and/or following non-zero count values;

repeat the preceding steps until each ordered series of values comprises no zero count values, which are preceded and followed by a non-zero count value;

store the corrected series in the memory element.

The device can, in various instances, comprise signal receiving and measuring means capable of receiving electromagnetic signals from a set of K>1 access points emitting such signals, and measuring the signal power thereof, with respect to a set of predetermined locations. The computing means can, in various instances, be further configured to:

measure at least one series of received signal power values during a predetermined time period from at least one access point;

compute for each distinct signal power value, the respective count values indicating how many times each signal power value was measured during the time period, and store the signal power and count values in the memory element.

Further, the computing means can, in various instances, be configured to determine a signal power value based on each corrected series of signal power count values. The computing means can furthermore be configured to carry out any of the previously described method steps according to the invention.

In various embodiments, the device can further comprise data receiving and transmitting means capable of receiving and transmitting data from a computing device in a communication network, and wherein the computing means are further configured to:

transmit the corrected series of values to a computing device using the data transmitting means;

receive a location from the computing device using the data receiving means, wherein the location is determined based on the corrected series of values.

According to various embodiments of invention, there is provided a computer capable of carrying out the method according to the invention.

In accordance with various embodiments of the invention, there is provided a computer program comprising computer readable code means, which when run on a computer, causes the computer to carry out the method according to the invention. According to yet other embodiments of the invention there is provided a computer program product comprising a computer-readable medium on which this computer program is stored.

By using the method in accordance to the invention, it becomes possible to extend the known framework of probabilistic device localization in wireless networks to practical cases using widely available consumer grade smartphone and tablet computers.

Radio maps, which map received signal strengths to the probability of the receiving device being in a specific location in the coverage area of a set of wireless access points, can be provided based on the type of receiving device and/or operating system that is being used on the device. Each device type and operating system potentially exhibits a power saving pattern, which is not directly appreciable by the user, but which impacts the accuracy and/or availability of RSSI values provided for the device's position determination. For example, due to the power saving pattern, a reported RSSI sample can indicate zero signal strength because the receiving antenna was switched off when the value was requested through the device's operating system. The method provides a way to correct erroneous RSSI values, which are due to the power saving pattern implemented by the operating system and/or on a chip of the receiving device. The corrected values can be used both during the phase of radio map construction and localization. In order to perform the corrections, the proposed method does not require a large training set or a prolonged training phase.

The determined location can further be refined based on the movement history of the device and on several assumptions made thereon.

By using the method according to the invention as an application on out-of-the-box mobile devices, location determination accuracies of up to 1 m have been observed in indoor use cases. This enables the use of the method, among many other imaginable service applications, to be used in indoor location based information systems. For example, a visitor to an art exhibition can receive specific data on his mobile device, depending on his location in the exhibition room. The method can advantageously be deployed as a software service, without requiring the existing equipment infrastructure to be expanded or altered, provided that the area of localization is covered by any existing wireless access point infrastructure. Therefore the method and system in accordance with the invention provides low deployment costs.

DRAWINGS

Several embodiments of the present invention are illustrated by way of figures, which do not limit the scope of the invention.

DETAILED DESCRIPTION

Figure 1:
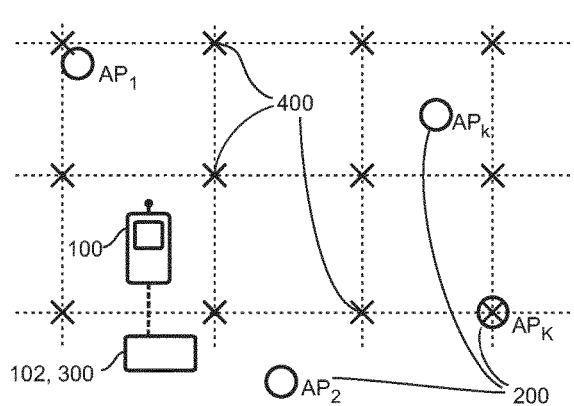
FIG. 1 is a schematic illustration of a setup in which the method according to invention finds its application.

This section describes the invention in further detail based on various embodiments and on the figures, without limiting the scope of the invention to the disclosed examples.

The method according to the invention acquires, at a mobile device, an indication of the signal strength or signal power of a set of deployed access points, such as for example WLAN access points. By using a previously constructed mapping, which will be referred to as a radio map, and which maps the received signal strengths to probabilities of being in a specific location within the coverage area of the access points, the method locates the receiving device as being at a location at which the probability of measuring the set of signal strengths is highest.

It has been observed that without further processing, the received signal strength indication values, RSSI, which are provided by the operating system of the measuring device, are not always accurate and reliable indications of the effective signal strength available at the device's location.

The mobile devices of concern are typically equipped with integrated WLAN receiving means, and often different system functions are collocated on the same physical chip inside the device. The WLAN receiving means are often highly directional antennas. The operating systems, OS, used to run the hardware implement trade-offs between the availability of all functions of the device on the one hand, and the availability of battery power on the other hand. In order to reduce system power consumption, the OS can choose to switch several system functions off from time to time, in a way that is not transparent to the user of the device. If a software application requires an RSSI value, it requests it from the OS via a dedicated application programming interface, API, call. Following extensive testing of the provided RSSI values on mobile device having integrated WLAN receiving means, it has been observed that the provided values are polluted by a random noise. Zero values are provided randomly, which cannot be attributed to a channel model of the communication path linking the device to the access point, or to interference with signals external to the device. For two similar devices measuring the power of the same signal in the same location, RSSI values requested at the devices at the same time for the same access points have provided zero values for one, while full signal strength has been reported on the other. This phenomenon has not been described in the prior art and none of the channel models in the prior art are able to take these random noise realizations into account.

The source of this noise appears to be the power-management of the device, which is implemented in the operating system or directly on the system chip. When zero signal power is reported as an RSSI value, this can be the result of the antenna having been shut down at the time of measurement, in order to reduce overall battery consumption. While during normal operation of the device, these outages take little significance, the proposed localization method relies on a small number of RSSI sample values, on which the produced random noise has a potentially big impact. The method according to the invention allows taking the described noise into account to improve the ability to locate the device based on received signal strength of electromagnetic signals.

In accordance with the invention, the RSSI values, which are used for the computation of a localization sample and, in various instances, for both the radio map construction and the computation of a localization sample, are indirectly corrected in order to eliminate the incorrect values that are due to power saving methods implemented by the OS or on the chip. While this describes the essence of the present invention in general terms, further details will now be described based on various embodiments of the invention.

FIG. 1 illustrates a mobile device 100, which is located or moves within the coverage area of a set of access points $AP_1, \ldots, AP_K$ emitting an electromagnetic signal. The device is equipped with receiving and measuring means, which allow the reception of the electromagnetic signal and the measuring of the signal power thereof. Such receiving and measuring means are well known in the art and known mobile computing devices such as smartphones or tablet computers are equipped with such means. A set of predetermined locations 400 is provided. The locations 400 as well as the positions of the access points are fixed and their positions can be stored in a database by means of 2D or 3D coordinates. The database can be provided on a computing device 102, on which it can accessible by the device 100 by means of a communication channel, or it can be stored on the device 100—in which case the computing device 102 and the device 100 are the same physical entity. While the locations 400 are shown to form a grid, the locations 400 can be arbitrarily distributed in the coverage area of the access points. The locations can be spaced by about 5 meters. The distance between neighboring locations can also be less than 5 meters, as for example 1 meter.

Figure 2:
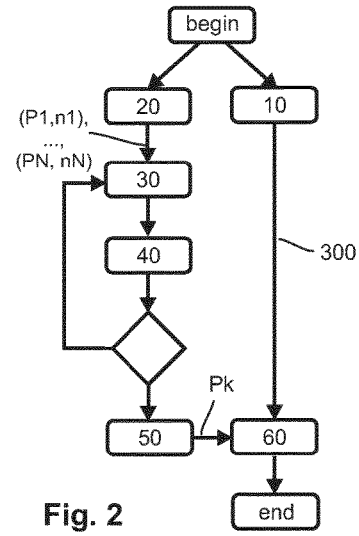
FIG. 2 is a workflow illustrating the main method steps according to various embodiments of the invention.

FIG. 2 illustrates the main steps of the method according to the invention. In a first step 10, a radio map is provided, which assigns a probability value to each location 400 in the set of predetermined locations. Each probability value is associated with a vector of determined signal power values, wherein each vector component $P_k$, $1 \leq k \leq K$, represents an indication of the power of the signal emitted by a given access point, as received by the device 100 in the location of measurement. The radio map can be provided as a look-up table or in a database structure. As will be discussed further below, the radio map can be stored on the device 100, or it can be stored on a computing device or server 102, which is collocated with the device 100 on a communication network.

In a second step 20, an ordered series of N increasing distinct measured signal power values is provided for each one of the signals emitted by the K access points. The values are measured at the device 100. The workflow shows the steps for treating the signal emitted by one of the access points for the sake of clarity. The signal power values are ordered according to their magnitude by algorithms known in the art. The values represent the signal power values as measured by the device 100, and they can be subject to the random noise process realization described above. Together with each signal power value, a count value n is provided, which indicates how often each signal power value was measured by the device during a predetermined time period.

For example, the time period can be equal to about 5 seconds. Alternatively, the time period can be longer than 5 seconds. For example, it can be equal to about 10 seconds. Depending on the type of device, and its capability to subsequent signal power values, about one measurement per second can be provided per second for each one of the K signals emitted by the K access points.

Figure 3:
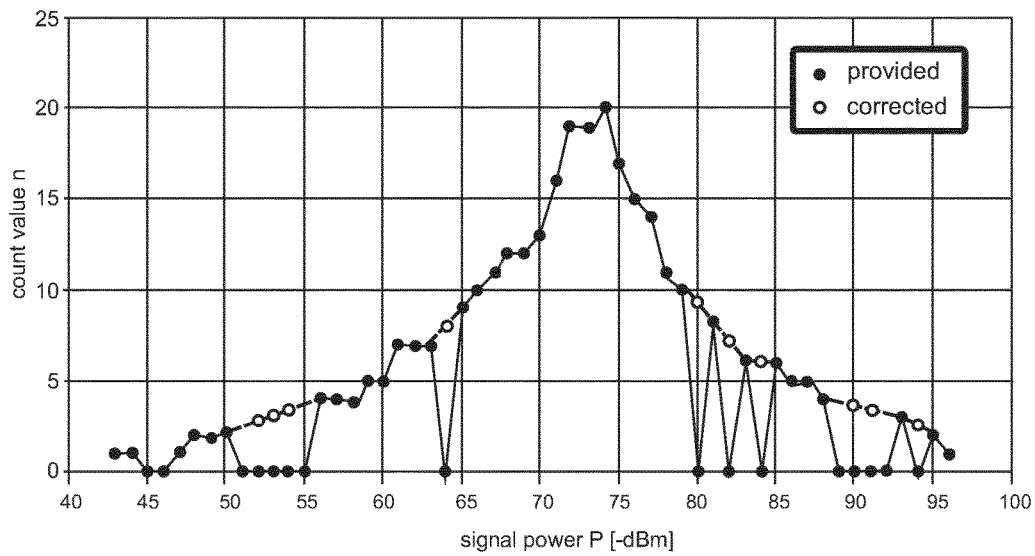
FIG. 3 is an example plot of measured and corrected count values of a series of measured signal power values, in accordance with various embodiments of the invention.

The signal power values, provided in −dBm, together with their respective count values can be represented by a histogram, as illustrated in FIG. 3. Due to the described measurement outages caused by power-saving routines, some of the count values can be equal to zero, while the physically available signal power at the time of measurement was in fact higher. During step 30, such erroneous zero count values, or sequences of zero count values, are detected. The erroneous count values correspond to "gaps" in the histogram, which are preceded and followed by non-empty histogram bins.

During step 40, a detected erroneous count value, or sequence of such values, is corrected by interpolation. The non-zero value is for example set to a corrected value, which is a function of preceding and/or following non-zero count values. In various embodiments, the corrected value is a function of the non-zero count values immediately preceding and following the detected gap. As illustrated by the example of FIG. 3, the corrected values, shown as white dots, can be set so that the corrected values, the preceding and following non-zero values, each satisfy a linear function of the signal power. While other interpolation methods are feasible, this simple heuristic has provided surprisingly good results. Formally, if $P_i$ and $P_j$, $i<j$, are non-zero signal power values as shown in FIG. 3, and $n_i$, $n_j$ are the corresponding count values, then the gap in count values between them will be filled with values that satisfy the following set of equations:

$$aP_i + b = n_i \quad \text{(E.1)}$$

$$aP_j + b = n_j \quad \text{(E.2)}$$

Which yields:

$$a = \frac{n_i - n_j}{P_i - P_j} \quad \text{(E. 3)}$$

$$b = n_i - \left(\frac{n_i - n_j}{P_i - P_j}\right) P_i \quad \text{(E. 4)}$$

Alternatively, the count values can be corrected so that all count values satisfy a Gaussian function.

After step 40, the method checks whether all histogram gap values have been filled. If not, steps 30 and 40 are repeated until all erroneous count values have been corrected as described. Once this is the case, a signal power value Pk is determined in step 50. In various embodiments Pk is the weighted mean of the measured distinct signal power values, each weighted by their respective corrected count values. Formally, if N is the number of distinct measured signal power values P1, ..., PN, and if the corrected count values are given by m1, ..., mN, then for each access point k, the determined received signal power is computed as:

$$Pk = \frac{1}{\sum_{n=1}^{N} m_n} \left( \sum_{n=1}^{N} P_n m_n \right) \quad \text{(E. 5)}$$

Steps 20 to 50 can be performed by the measuring device 100 or by the computing device or server 102, after the originally and uncorrected signal power values have been provided at the computing device 102.

The resulting values Pk, k, 1≤k≤K, represent the vector which is used in step 60 to determine the location of the device 100, by means of the radio map 300. Again, this step can be performed on the mobile computing device 100 itself, or on the computing device or server 102. In the latter case, the mobile computing device 100 and the device 102 physically correspond to the same entity. The vector of values Pk is also referred to as a localization sample of the available signal powers. The location determination using the radio map is, in various instances, performed as known in the art, for example from patent document US 2005/0243936 A1. In various embodiments, the location of the device 100 is determined as the predetermined location for which the mapping 300 indicates the highest probability based on the vector of determined signal values.

Specifically, each component Pk corresponding to access point k, maps to a probability value of the device 100 being in each one of the predetermined locations. Indeed each predetermined location is specified by k signal power value probabilities. For each one of the predetermined locations, the k probability values indicated by the mapping 300 are multiplied to yield the probability of the device being in the predetermined location. This allows selecting the most probable among the predetermined locations, given the localization sample.

Alternatively, the location of the device 100 is determined by selecting three or more predetermined locations for which the mapping 300 indicates the three or more highest probabilities based on the vector of determined signal power values. The position is then computed by taking the average location of the predetermined locations.

The determined position is, in various instances, stored for future use. In particular, a history of determined locations can be stored for each uniquely identifiable device whose position is being determined. If a determined position is unlikely with respect to previously determined locations for the same device, the determined position can, in various instances, be rejected as being erroneous. The likelihood of a determined position with respect to previously determined positions can for example be expressed by an inverse of the distance between subsequently determined positions. Device or user movement models, which are as such known in the art, can further be implemented to refine the determined location. Further, the determined location of the device can be further refined by using data made available on the device 100 by other sensing means, such as gyroscopes, GPS receivers and others.

The determined location can be provided in absolute geographical coordinates, which facilitates a possible handover to a GPS positioning service once a line of sight to GPS satellites becomes available at the measuring device. Alternatively, the determined location can be provided in relative coordinates with respect to known reference locations, for example the predetermined locations 400 or the locations of the access points from which the electromagnetic signals are emitted.

Figure 4:
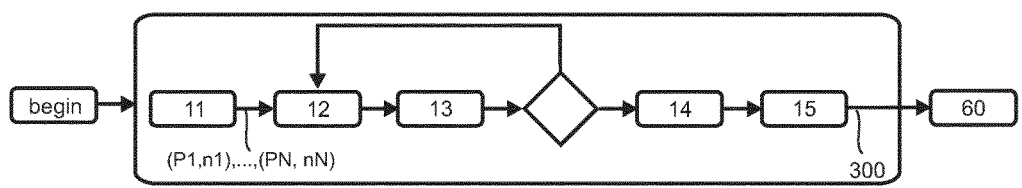
FIG. 4 is a workflow illustrating details of a method step according to various embodiments of the invention.

A ground truth radio map can be available for using the localization method in accordance with the invention. Alternatively, if the radio map is computed using a mobile device, during the computation of the radio map 300, the same phenomenon due to power saving of the measuring device, can distort the values used to compute the probabilities, which are required for location determination. It is therefore useful to apply the same correction method according to the invention during step 10, in which the radio map 300 is provided. In various embodiments illustrated by the workflow of FIG. 4, step 10 comprises steps that correct the measurements used for building the radio map 300. In step 11, for the signal emitted by each access point k, an ordered series of increasing distinct signal power values is provided. The signal power values are measured by a device in one of the predetermined locations 400 during a predetermined time period. The time period can for example be a period of 60 seconds or less. Depending on the type of device, and its capability to subsequent signal power values, about one measurement per second can be provided per second for each one of the K signals emitted by the K access points.

The occurrence of each distinct measured signal power value is counted and associated to the corresponding signal power value. This results in a histogram similar to the histogram of FIG. 3. In step 12, a count value or sequence of count values, which are preceded and followed by a non-zero count value, is detected. The detected values are corrected using one of the methods described above in step 13. Steps 12 and 13 are repeated until all histogram gaps have been filled.

Alternatively or additionally, simultaneous measurement from several devices of the same type can be used to measure the signal power strength in the same predetermined locations. The step of correcting the count values 40 in that case further comprises:

- initializing corrected count values for each distinct signal power value to zero;
- collecting the measured signal power values from all measuring device at a computing device;
- at the computing device, detecting distinct signal power values for which each one of the devices has provided a non-zero count value, and using the average of the count values as the corrected count value for the detected signal power values;
- detecting distinct signal power values for which at least one device provided a count value being equal to zero, preceded and followed by non-zero count values, and updating the corrected count value to the average of the non-zero count values that are provided for the same signal power value by other devices.

During step 14, the resulting corrected count values are normalized so that their sum adds up to one. The normalized histogram value of a histogram bin represents the probability of occurrence of the corresponding signal power value. The resulting distributions for each access point are stored in the radio map 300 in step 15. The above steps are repeated for each one of the predetermined locations 400 until the radio map is complete.

It should be noted that the occurrence of "gaps" in the described histograms depends on the type of device that is used to measure the signal strength, that is, on the type of sensing chip and antenna that is used, as well as on the version of the OS that is run on the measuring device. Therefore, in various embodiments of the invention, a plurality of radio maps 300 is generated using different types of devices. If a device intends to determine its position, it identifies its device type first, which determines the radio map that has been generated using the same device type. The corresponding radio map will be used to determine the location in step 60. Matching the device that computes the corrected localization sample vector with the measuring device that was used to build the radio map increases the accuracy of the positioning algorithm.

According to various embodiments, the device 100 measures the signal power values using signal measuring means. The measurements are provided as RSSI values and stored in a memory element of the device. The device 100 comprises computing means such as a Central Processing Unit, CPU, which implements steps 30 to 50 as described above. The radio map 300 is also stored in a memory element of the device 100, so that the device can determine its location by itself. The determined location can then be used by other applications executing on the device, such as location-based services.

According to other various embodiments, the device 100 measures the signal power values using signal measuring means. The measurements are provided as RSSI values and stored in a memory element of the device. The device 100 comprises computing means such as a Central Processing Unit, CPU, which implements steps 30 to 50 as described above. The determined signal power values Pk are stored in a memory element of the device 100. The device comprises transmitting means, which allow it to transmit data to a remote computing device 102 by means of a communication channel in a communication network. The device transmits the determined signal power values Pk to the remote computing device, on which the radio map 300 is stored. The remote computing device comprises receiving means for receiving the transmitted values, a memory element and computing means which implement step 60 of the described method. Once the location of the requesting device 100 has been determined, it is transmitted from the remote computing device to the device 100 by means of communication channel.

According to yet other various embodiments, the device 100 measures the signal power values using signal measuring means. The measurements are provided as RSSI values and stored in a memory element of the device. The device comprises transmitting means, which allow it to transmit data to a remote computing device 102 by means of a communication channel in a communication network. The device transmits the measured, uncorrected signal power values to the remote computing device, which has access to the radio map 300, which can be stored on the same computing device, or on another computing device in the communication network. The remote computing device comprises receiving means for receiving the transmitted values, a memory element and computing means which implement steps 30 to 60 of the method according to the invention. Once the location of the requesting device 100 has been determined, it is transmitted from the remote computing device to the device 100 by means of communication channel.

While building the radio map 300, the device 100 measures the signal power values using signal measuring means. The measurements are provided as RSSI values and stored in a memory element of the device. The device comprises transmitting means, which allow it to transmit data to a remote computing device 102 by means of a communication channel in a communication network. The device transmits the measured, uncorrected signal power values to the remote computing device, which implements steps 11 to 15 to build the radio map. Alternatively, the device 100 implements method steps 11 to 15 and transmits the corrected values to the remote computing device. Once the remote computing device has gathered all the required information for completing the radio map, 300, the latter is stored either on the remote device, on another remote computing device, or distributed to the mobile terminal devices.

The skilled person will be able to provide a computer program implementing some or all of the method steps according to the invention based on the provided description and the accompanying drawings. Such a computer program, when run on a computer or mobile computing device, will lead the computer or mobile computing device to execute the described method steps.

It should be understood that the detailed description of specific exemplary embodiments is given by way of illustration only, since various changes and modifications within the scope of the invention will be apparent to the skilled man. The scope of protection is defined by the following set of claims.

The invention claimed is:

1. A method for determining the position of a mobile computing device capable of receiving electromagnetic signals from a set of K>1 access points emitting such signals, and measuring the signal power thereof, with respect to a set of predetermined locations, wherein said method comprises:

providing, at a computing device, a mapping, which assigns a probability value to each location in the set of predetermined locations, as a function of a vector of determined signal power values, wherein each vector component represents an indication of the power of the signal emitted by a given access point k, $1 \leq k \leq K$, as received by the mobile computing device in a given location;

providing, for the signal emitted by each access point k, an ordered series of increasing distinct signal power values as measured by the device in a given location, together with respective count values indicating how many times each signal power value was measured during a predetermined time period;

for each ordered series of values, detecting a count value or a sequence of count values being equal to zero, which is preceded and followed by a non-zero count value;

correcting the detected count values to non-zero count values, wherein the non-zero count values are computed using an interpolating function of preceding and/or following non-zero count values;

repeating the steps and until each ordered series of values comprises no zero count values, which are preceded and followed by a non-zero count value;

determining a signal power value for the signal emitted by each access point, wherein the value is based on the corrected series of signal power count values, and providing the determined signal power values at the computing device; and determining, at the computing device, the location of the mobile computing device, wherein the location is determined using at least the predetermined location for which the mapping indicates the highest probability based on the determined signal power values.

2. The method according to claim 1, wherein correcting the detected count values comprises setting the detected count values so that the preceding and following non zero count values, and the corrected count values, satisfy a linear function of the signal power.

3. The method according to claim 2, wherein determining a signal power comprises setting the determined signal power to a weighted average of the values in the provided series of measured signal power values, wherein each signal power value is weighted by its corresponding corrected count value.

4. The method according to claim 3, wherein position determination further comprises selecting the location of the receiving device as the predetermined location for which the mapping indicates the highest probability based on the vector of determined signal power values.

5. The method according to claim 3, wherein position determination further comprises:

selecting three or more predetermined locations for which the mapping indicates the three or more highest probabilities based on the vector of determined signal power values, and computing the position of the receiving device as the average location of the selected predetermined locations.

6. The method according to claim 5, wherein providing a mapping further comprises:

providing, at a computing device, for the signal emitted by each access point, an ordered series of increasing distinct signal power values as measured by a device in one of the predetermined locations, together with respective count values indicating how many times each signal power value was measured during a predetermined time period;

for each ordered series of values, detecting a count value or a sequence of count values being equal to zero, which is preceded and followed by a non-zero count value;

correcting the detected count values to non-zero count values, wherein the non-zero count values are computed using an interpolating function of preceding and/or following non-zero count values;

repeating the steps and until each ordered series of values comprises no zero count values, which are preceded and followed by a non-zero count value;

normalizing in each series the count values so that their sum adds up to one, and so that each normalized value represents the probability of occurrence of the corresponding signal power value;

associating the probabilities with the corresponding access point and the predetermined location, and providing the resulting mapping at the computing device;

repeating the above steps for each of the predetermined locations.

7. The method according to claim 6, wherein correcting the detected count values comprises setting the detected count values so that the preceding and following non zero count values, and the corrected count values, satisfy a linear function of the signal power.

8. A device for determining the position of a mobile computing device capable of receiving electromagnetic signals from a set of K>1 access points emitting such signals, and measuring the signal power thereof, with respect to a set of predetermined locations, said device comprising:

a memory element, in which at least one ordered series of increasing distinct signal power values are provided, together with respective count values indicating how many times each signal power value was measured during a predetermined time period by a measuring means during a predetermined time period; and a computing means, wherein the computing means configured to:

detect, for each ordered series of values, a count value or a sequence of count values being equal to zero, which is preceded and followed by a non-zero count value;

correct the detected count values to non-zero count values, which are a function of preceding and/or following non-zero count values;

repeat the preceding steps until each ordered series of values comprises no zero count values, which are preceded and followed by a non-zero count value;

store the corrected series in the memory element;

determining a signal power value for the signal emitted by each access point, wherein the value is based on the corrected series of signal power count values, and providing the determined signal power values at the computing device; and determining, at the computing device, the location of the mobile computing device wherein the location is determined using at least the predetermined location for which the mapping indicates the highest probability based on the determined signal power values.

9. The device according to claim 8, wherein the device further comprises signal receiving and measuring means capable of receiving electromagnetic signals from a set of K>1 access points emitting such signals, and measuring the signal power thereof, with respect to a set of predetermined locations, and wherein the computing means are further configured to:

measure at least one series of received signal power values during a predetermined time period;

compute for each distinct signal power value, the respective count values indicating how many times each signal power value was measured during the time period, and store the signal power and count values in the memory element.

10. The device according to claim 9, wherein the computing means are further configured to determine a signal power value based on each corrected series of signal power count values.

11. The device according to claim 10, wherein the computing means are further configured to:

set the detected count values so that the preceding and following non zero count values, and the corrected count values, satisfy a linear function of the signal power;

set the determined signal power to a weighted average of the values in the provided series of measured signal power values, wherein each signal power value is weighted by its corresponding corrected count value;

select the location of the receiving device as a predetermined location for which mapping indicates the highest probability based on a vector of determined signal power values; and select three or more predetermined locations for which the mapping indicates the three or more highest probabilities based on the vector of determined signal power values, and compute the position of the receiving device as the average location of said selected predetermined locations.

12. The device according to claim 11, wherein the device further comprises data receiving and transmitting means capable of receiving and transmitting data from a computing device in a communication network, and wherein the computing means are further configured to:

transmit the corrected series of values to a computing device using the data transmitting means; and receive a location from the computing device using the data receiving means, wherein the location is determined based on the corrected series of values.

13. A computer structured and operable to:

provide, at a computing device, a mapping, which assigns a probability value to each location in the set of predetermined locations, as a function of a vector of determined signal power values, wherein each vector component represents an indication of the power of the signal emitted by a given access point k, $1 \leq k \leq K$, as received by the mobile computing device in a given location;

provide, for the signal emitted by each access point k, an ordered series of increasing distinct signal power values as measured by the device in a given location, together with respective count values indicating how many times each signal power value was measured during a predetermined time period;

for each ordered series of values, detect a count value or a sequence of count values being equal to zero, which is preceded and followed by a non-zero count value;

correct the detected count values to non-zero count values, wherein the non-zero count values are computed using an interpolating function of preceding and/or following non-zero count values;

repeat the steps and until each ordered series of values comprises no zero count values, which are preceded and followed by a non-zero count value;

determine a signal power value for the signal emitted by each access point, wherein the value is based on the corrected series of signal power count values, and providing the determined signal power values at the computing device; and determine, at the computing device, the location of the mobile computing device, wherein the location is determined using at least the predetermined location for which the mapping indicates the highest probability based on the determined signal power values.

* * * * *